United States Patent
Engel et al.

(10) Patent No.: US 8,210,580 B2
(45) Date of Patent: Jul. 3, 2012

(54) DETENT ASSEMBLY AND ITS APPLICATION TO ACTUATION MEANS

(75) Inventors: Heinz-Eckhard Engel, Glurns (IT); Helmut Alber, Schlanders (IT)

(73) Assignee: Hoppe AG (IT)

( * ) Notice: Subject to any disclaimer, the term of this patent is extended or adjusted under 35 U.S.C. 154(b) by 926 days.

(21) Appl. No.: 11/711,686

(22) Filed: Feb. 28, 2007

(65) Prior Publication Data
US 2008/0012360 A1 Jan. 17, 2008

(30) Foreign Application Priority Data
Mar. 1, 2006 (DE) .......... 10 2006 009 371

(51) Int. Cl.
*E05B 3/00* (2006.01)
(52) U.S. Cl. .......... 292/252; 403/322.2; 403/DIG. 6
(58) Field of Classification Search .......... 292/252, 292/9, 12, 15, 23, 75, 77, 79, 73, 193, 239; 24/136 A, 115 L; 70/295, 385; 403/322.2 X, 403/DIG. 6 X
See application file for complete search history.

(56) References Cited

U.S. PATENT DOCUMENTS

| | | | |
|---|---|---|---|
| 2,108,326 A | 2/1938 | Adams | |
| 5,495,868 A * | 3/1996 | Cummings | 137/315.38 |
| 6,109,818 A * | 8/2000 | Engel | 403/322.2 |
| 6,360,408 B1 * | 3/2002 | Dykstra et al. | 24/598.7 |
| 6,425,837 B1 | 7/2002 | Ochiai | |
| 6,554,524 B1 * | 4/2003 | Smith | 403/78 |
| 6,598,909 B2 * | 7/2003 | Lu | 292/144 |
| 7,419,464 B2 * | 9/2008 | Matusima | 494/84 |
| 7,434,892 B2 * | 10/2008 | Mercat et al. | 301/124.2 |

FOREIGN PATENT DOCUMENTS

| | | |
|---|---|---|
| DE | 7431689 | 6/1975 |
| DE | 7503143 | 8/1975 |
| DE | 3402089 | 8/1985 |
| DE | 3904997 | 8/1990 |
| DE | 29903896 | 7/2000 |
| DE | 20007818 | 8/2000 |
| DE | 10100874 | 9/2002 |
| DE | 10162707 A1 | 7/2003 |
| DE | 10211704 C1 | 8/2003 |
| EP | 0406566 | 1/1991 |
| EP | 1121501 B1 | 10/1999 |
| EP | 1321604 | 6/2003 |

* cited by examiner

*Primary Examiner* — Carlos Lugo
*Assistant Examiner* — Mark Williams
(74) *Attorney, Agent, or Firm* — Reinhart Boerner Van Deuren s.c.

(57) ABSTRACT

A detent assembly—namely of pairs of sub-assemblies of which the individual ones comprise spatially directly associated surfaces at which projecting elements cooperate with engaging elements in prestressed manner—comprises at least one detent element within a detent sub-assembly, said detent element being retained prestressed within an obliquely directed guide in a manner that it projects beyond a detent sub-assembly outer surface and that it enters an aperture sub-assembly while being obliquely prestressed into a recess of an opposite aperture outer surface and rests only unilaterally and point-wise against associated rim sites of the mutually associated interlocking zones. A preferred application relates to a handle being supported rotatably but in axially fixed position by a stop fitted with a disk connected to a handle extension and comprising circumferential interlocking recesses, for instance notches. The stop is fitted with guides containing compression springs to prestress balls and to guide them at an angle to the line of symmetry of the notches. To attain play-free interlocking, the guide-supported detent balls act point-wise on the interlocking notches of the disk.

15 Claims, 4 Drawing Sheets

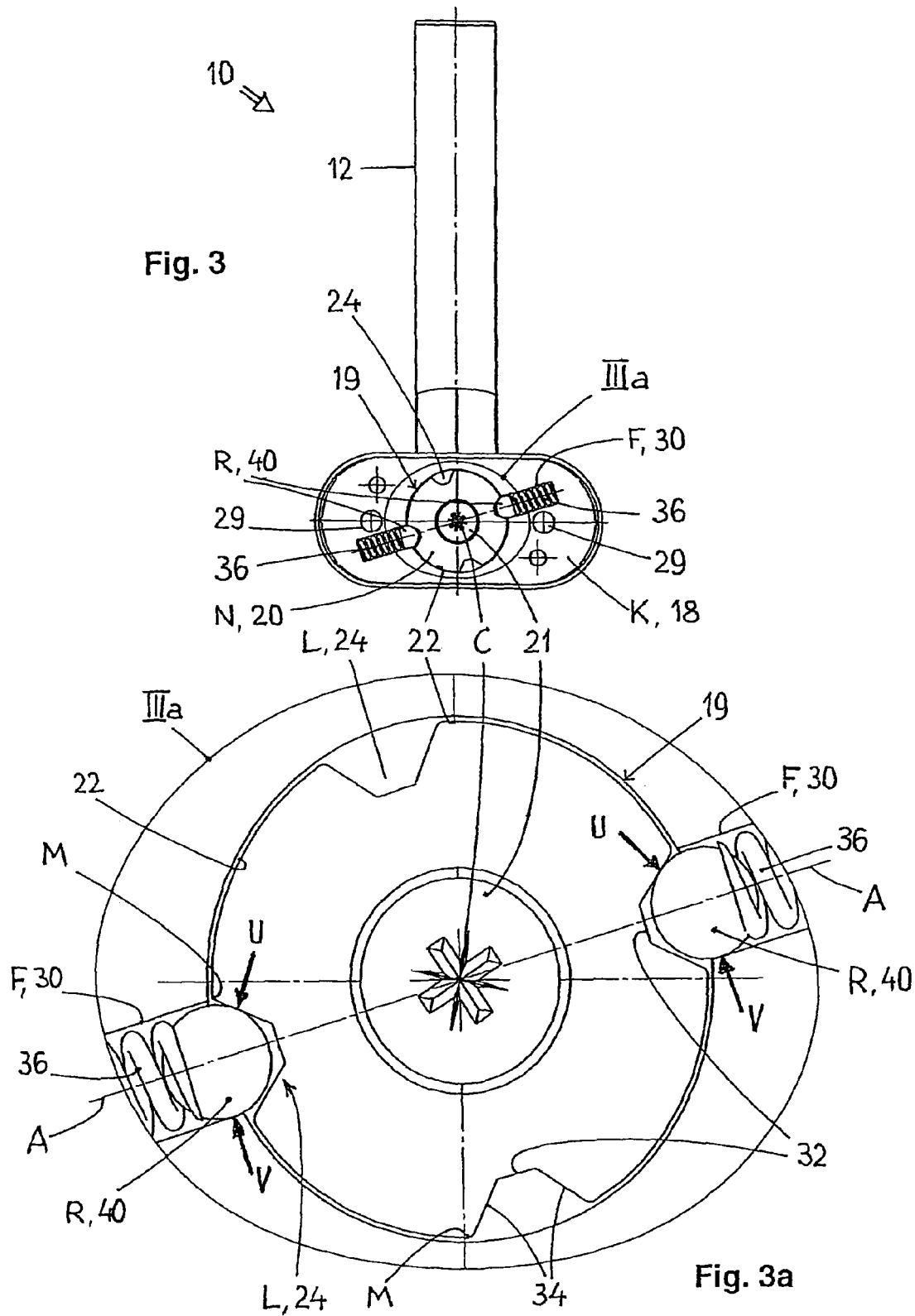

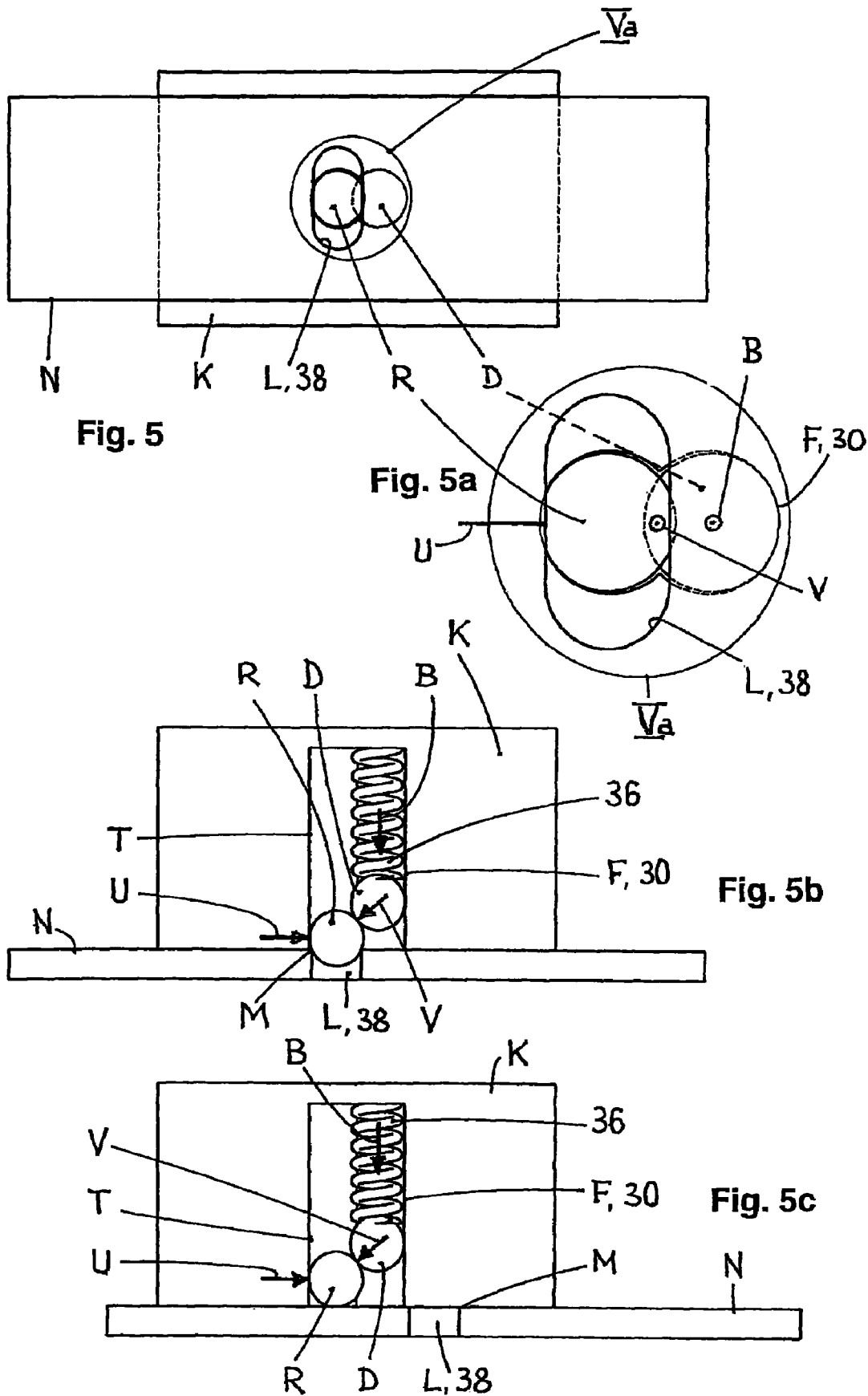

DETENT ASSEMBLY AND ITS APPLICATION TO ACTUATION MEANS

Figure 1:
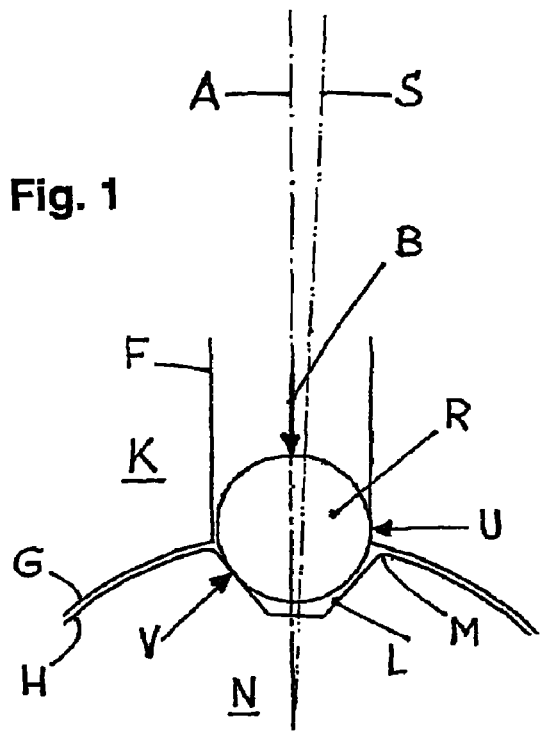

The present invention relates to detent assemblies used for mutually displaceable sub-assemblies as defined in the preambles of claims 1 and 9 and in particular to such detent assemblies used to operate room closures such as doors and windows as defined in the preamble of claim 13.

There is a need in many fields of engineering for detent assemblies detachably interlocking mutually displaceable sub-assemblies. Foremost when one sub-assembly is stationary, it is often desired or necessary at least to temporarily keep fixed the position of another sub-assembly associated with the former. A commonplace example is the detent interlocking of drawers, door or furniture wings, implemented for instance by so-called snap-in elements. Such snap-in elements typically consist of a sheetmetal element fitted with a circular or oval aperture, mounted on an adjoining surface, and of a housing containing a spring-loaded ball, at an illustratively folding or pivotable adjacent surface element. When a desired position has been reached, the ball drops into the sheetmetal aperture, as a result of which said sub-assemblies are detachably interlocked to each other, even if, often enough, such affixation is accompanied by annoying jitter or rattling.

A considerable field of application of detent assemblies are windows and door actuation means. Typically the door handles are affixed by means of an extension in rotatable but axially stationary manner on a stop, for instance a door plate, an affixation plate, a rosette or the like. Most often the stop is screwed into the window frame or the door surface. An illustratively plastic bearing bush situated between said stop and the handle extension assures low-friction and stable pivot support for the handle which at its rim or extension receives a square pin that, when actuated into rotation, drives a locking mechanism in the window frame or the door wing.

Whereas metallic handles frequently are flanged by a stop plate or a bearing bush in rotatable but axially fixed manner (DE U1-74 31 689), detent assemblies also are known for instance being used for plastic handles (DE U1-75 03 143 and EP A1 0 406 566). Moreover handles and stops have been designed separately, also with separate rosette or plate coverings, detachable detent interlocking being provided for such sub-assemblies, such detent assemblies allowing on-site mounting of the handle on the stop. The German patent document DE-U1 200 07 818 proposes slipping a bearing bush endwise on a handle collar to be interlocked or locked with said collar in irrotational and axially fixed manner. Balls, pins, bolts or the like are employed for that purpose which, when the square pin is inserted into the handle collar, shall enter in frictional and/or geometrically locking manner the matching recesses in the bearing bush. The handle is released from the stop plate only when the square pin is pulled out of the handle collar.

A substantial difficulty may arise in such designs in that the cooperating sub-assemblies in fact do not interlock effectively when in their nominally engaged positions but instead suffer from a more or less significant displacement play. As a result and in time, operational or mechanical difficulties frequently do arise. The user may encounter unreliability precisely with the very actuation means, for instance when detent balls resting in a fitting's plate drop into recesses in the form of grooves, flutes or apertures in general with interlock play. By their diameters (i.e. circumferentially) said balls impact on the left and on the right the detent recesses, as a result of which the handle exhibits a disagreeable jitter.

The objective of the present invention is to overcome the drawbacks of the state of the art by creating detent assemblies allowing playless detent interlocking into selected positions of simple configurations of sub-assemblies which are mutually displaceable, including in particular rotatable or pivotable sub-assemblies. Such detent assemblies also are applicable to axially fixed, rotatably supported actuation means that can be manufactured and assembled economically. The goal is to preclude any jitter or rattling play regardless of the skill of installer or user.

One detent assembly for mutually displaceable sub-assemblies—namely pairs of sub-assemblies of which the individual ones are fitted with surfaces that are spatially configured immediately near each other and of which the projecting elements cooperate with recessed ones in compressive manner, at least one prestressed detent element being in particular securely retained in a sub-assembly, a detent sub-assembly, in a guide, in a manner that it projects beyond an outer surface of the detent element sub-assembly and at least partly engages a recess in an opposite outer surface of the other sub-assembly—is characterized by claim 1 of the present invention by a design and system of the guide of the (or each) detent element so that this element is forced only unilaterally and point-wise against associated rim sites of the mutually associated detent zones. Accordingly and unlike the state of the art, the detent force does not act randomly on the recess' rim zone—whereby jitter is generally incurred—but instead the (or each) detent element is internally supported in its guide, and rests point-wise on its surface at its projecting outer portion against a lateral zone of said recess. In this manner the predetermined direction and configuration of guidance assures that interlocking shall be wholly playless.

When the said detent element is a ball, a (frustum of) cone or another revolving element, said recess may be a slot, groove or aperture, in the simplest case a circular or an elongated hole. Other geometries however also are applicable, illustratively polygonal or geometrically irregular sub-assemblies as long as their effective inside width shall be less than effective detent element diameter acting on the recess rim, as result of which said detent element is trapped except for its projection from said recess bottom.

Said recess rim defines a plane which is perpendicular to the said recess' line of symmetry. Preferably a ball shall be used which is configured in a guide of the detent element and is loaded therein by a compressive element and is situated excentrically in its engaged position relative to the recess/rest rim. Accordingly said guide is configured at a predetermined angle to said line of symmetry whereby the detent element within its guide shall be loaded by a compressive element in a direction deviating from the associated recess's line of symmetry. Being biased "sideways" by the compressive element's guide, the detent element therefore only rests unilaterally at its boundary, for instance against an aperture rim or a notch flank, as a result of which the two sub-assemblies interlock in playless manner. In this manner the present invention creates a substantive advance relative to conventional detent assemblies.

If the (or each) recess is fitted with a rest edge or notch flank obliquely spaced from the (or each) rest rim, the detent element, namely and illustratively a ball, then can be supported by said rest edge or notch flank without touching the rim situated ahead, this feature offering the advantage that in particular heavily used detent elements shall wear less.

In an especially advantageous embodiment of the present invention, the sub-assemblies to be interlocked shall be fitted with at least two mutually associated pairs of detents each consisting of one detent element and one recess. In this manner playless interlocking is automatically assured. Using exactly two sets of detent assemblies eliminates the need for dual matching.

As defined in independent claim 9, one of the sub-assemblies may be fitted with a disk configured on or in a rotating element and being rotatable about an axis while resting on or in an associated sub-assembly and fitted in particular at or near its circumference with a recess having a rest rim, said rim being directly opposite a revolving element in the associated sub-assembly, said revolving element preferably being a ball, this revolving element/ball being biased in the direction toward the said recess and being excentrically offset from said rest rim by the guide in the associated sub-assembly.

In one advantageous embodiment mode of the present invention, said recess comprises an axis of symmetry running parallel or perpendicularly to its boundary, therefore allowing axial or radial interlocking, that is both "bottom interlocking" and "side interlocking". Applicability is considerably widened thereby.

The recess part or said disk may comprise at least two diametrically opposite recesses, preferably in a manner that one revolving element (or a ball) shall be situated opposite each recess or every second recess. Accordingly the detent elements diametrically enclose the recess part.

According to the independent claim 13, the present invention relates to using a detent assembly of the above described kind and in particular for the actuation means of room closure means, namely doors or windows, further to a disk irrotationally configured near or in handle bearing and especially near a handle neck or extension and mounted in a stop, said disk being fitted at or near its circumference with detent recesses and being interlockable in playless manner by means of obliquely guided detent elements. This design assures irrotationality of the sub-assemblies.

A preferred application is a disk fitted on one of its surfaces and/or at its circumference with at least one recess comprising a rest rim, said rim being situated opposite a revolving element held in the stop, in particular said revolving element being a ball or balls biased toward the recess and being excentrically offset, by means of a guide, relative to this rest rim. The detent assembly so designed is considered reliable and long-lasting when used for handles.

When the said disk is basically circular and comprises a number of recesses configured in rotational symmetry about their axis, then the conventionally determined, clearly recognized angular handle position determines whether said room closure means is open, partly open or closed.

Preferably the disk-receiving stop is fitted with a notch entered by guides containing compression springs loading the detent element and point-wise supporting these elements in the interlocked position. Also the handle neck or lug may comprise a conventional blind hole receiving a physically matching drive element actuating a closure mechanism, in particular a square pin, to drive a locking bolt, latch or the like.

Further features, particulars and advantages of the present invention are disclosed by the claims and in the description below of embodiment modes and in relation to the drawings.

Figure 2:
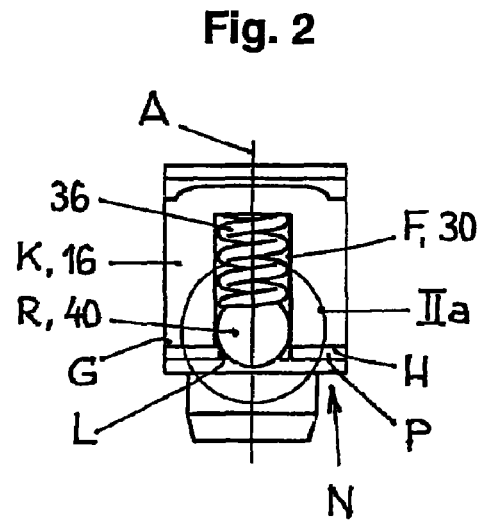
Figure 2A:
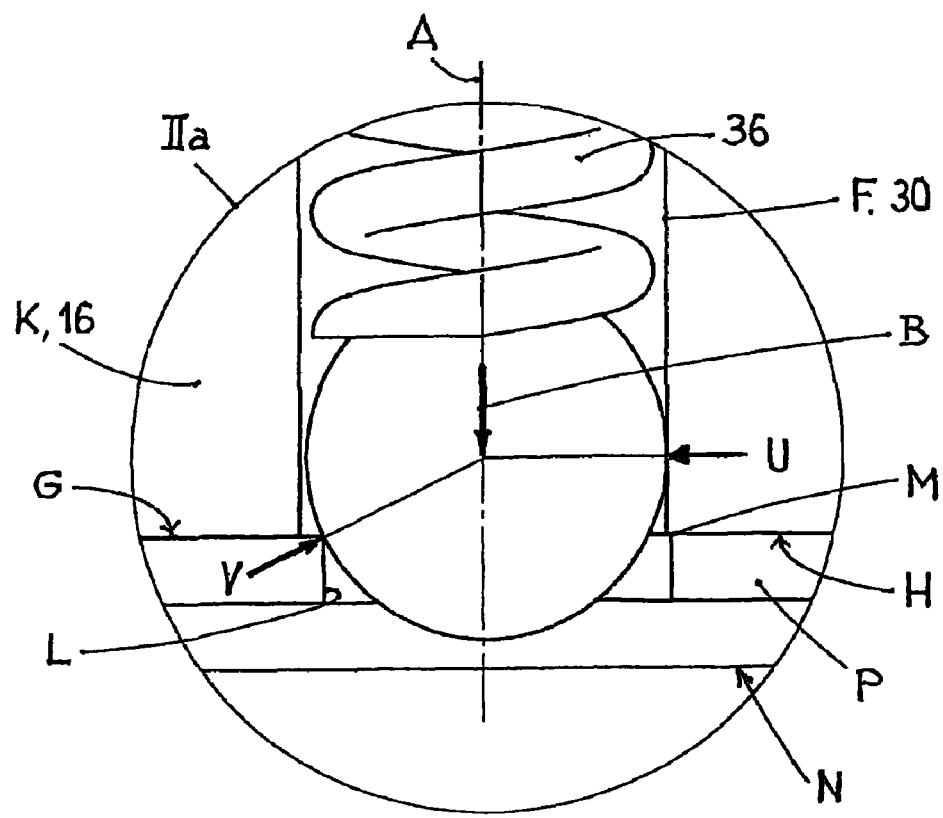
Figures 4, 4A:
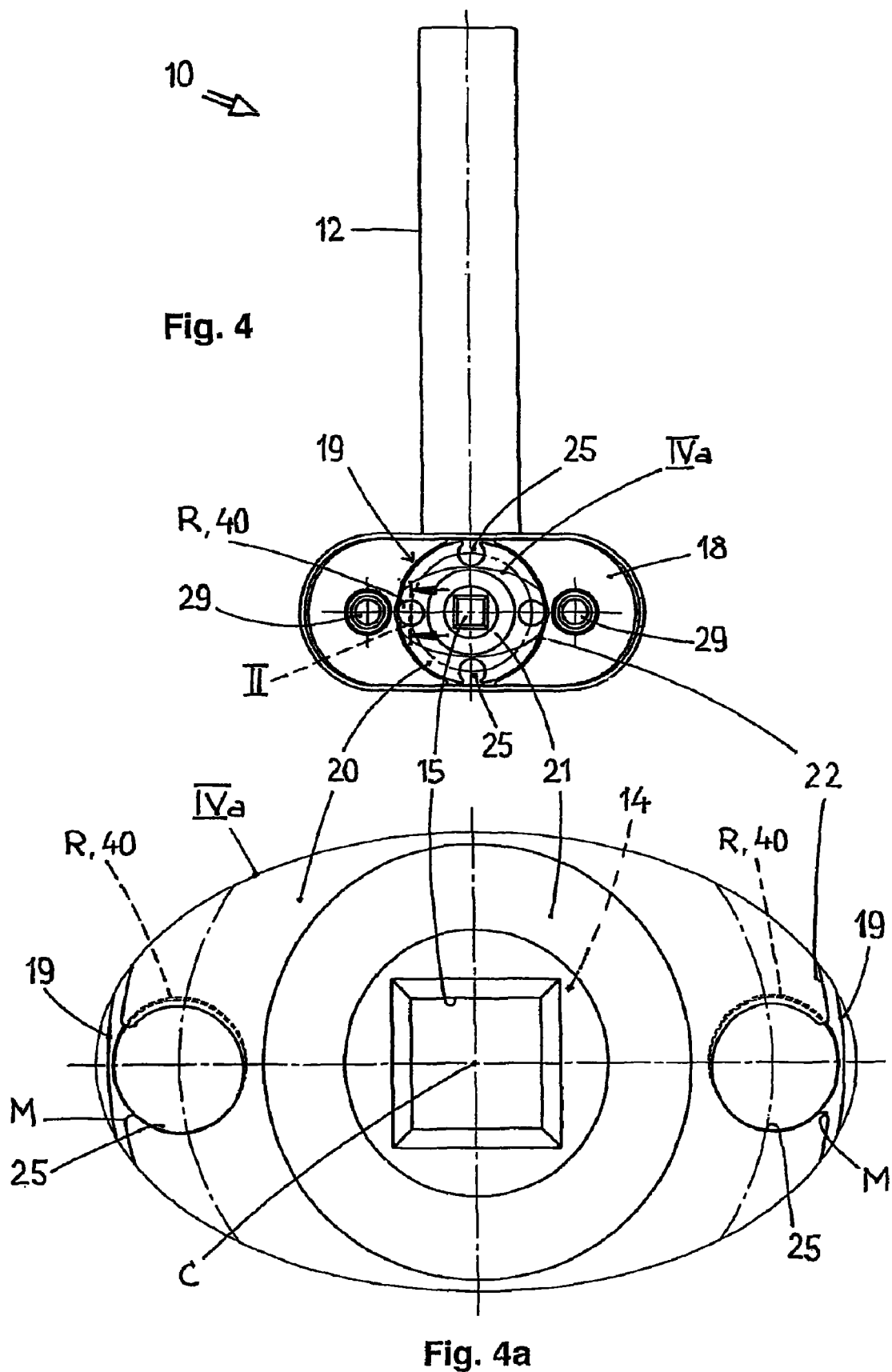

FIG. 1 shows a diagram of the forces acting on a detent assembly of the invention, FIG. 2 is a partial side view section of a detent assembly design, the section corresponding to the line II of FIG. 4, FIG. 2*a* is an enlarged cutaway corresponding to the circle IIa in FIG. 2, FIG. 3 is a bottom view of a stop with assembled drive means, FIG. 3*a* is an enlarged bottom view corresponding to the oval line IIIa of FIG. 3, FIG. 4 is a bottom view of a stop of a different design with assembled drive means, FIG. 4*a* is an enlarged bottom view corresponding to the oval line IVa of FIG. 4, FIG. 5 is a diagrammatic topview of a linear detent assembly in the interlocked position, FIG. 5*a* is an enlarged cutaway corresponding to the circular line Va of FIG. 5, FIG. 5*b* is a side sectional elevation of the interlocked linear detent assembly of FIG. 5, and FIG. 5*c* is a side sectional elevation of FIG. 5*b* but in the released position.

One main detent assembly configuration is shown in FIG. 1. Therein a detent sub-assembly K and a recess sub-assembly N are configured opposite each other, their outer surfaces G and H respectively being slidable relative to one another. A detent element R is situated at the lower end of a guide F in said detent sub-assembly K and in this instance is a ball which projects beyond the outside surface G of the detent element K and is forced, by a load B inside the guide F, along its axis A partly against (or into) a recess L of the other sub-assembly, i.e. the recess sub-assembly N. In the shown illustrative embodiment, the recess L is designed as a notch fitted with flanks and with an upper boundary M defining a plane which is perpendicular to an axis of symmetry S. Said line of symmetry S subtends an acute angle with the axis A of the guide F, as a result of which the ball R is supported point-wise in said guide and is forced by the force B on one hand against a recess flank and on the other hand against the said guide's outer rim above said recess flank. The force vectors V and U show the resulting play-less interlocking of the sub-assemblies K and N.

FIG. 2 and the associated enlargement of FIG. 2*a* show a practical embodiment of such an assembly. Therein the detent sub-assembly K constitutes a housing 16 fitted with a guide F (or 30) in the form of a blind hole supporting and guiding a compression spring 36. The force B of said spring 36 loads a ball R (or 40) which, in the shown interlocked position, comes to rest against the sites of the force vectors U and V, namely on one hand (at the right) on the mouth of the guide F/30 and on the other hand (at the left) on an edge of the aperture L of a plate P which is rigidly joined to the detent sub-assembly N or is integral with it. By shifting said plate P left or right, the ball R/40 is moved upward against the force B, that is, the sub-assemblies K, N are released.

FIG. 3 shows an actuation unit 10 of which the handle 12 bears at its neck (omitted) a disk N/20 which is firmly connected by a flange or by an axial screw 21 to said handle neck and furthermore is supported in a stop K or 18, said stop being affixable to a surface, for instance to a window frame, by means of (omitted) screws passing through tappet holes 29. The disk N/20 is fitted at its circumference 22 with four notches L/24 which are configured in cross-wise manner opposite each other. On each side of a notch bottom 32, a notch 24 comprises bilaterally symmetrical oblique notch flanks 34 of which the upper edge constitutes a boundary M. Two mutually diametrically opposite guides F/30 are offset obliquely to the main dimension of the stop K/18 and are contained in it along an axis A which intersects the axis of rotation C of the disk N/20, said two guides F/30 each supporting one compression spring 36. Balls R/40 loaded by said compression springs 36 each reach their interlocking position at a point of application U of a notch flank 34 of the disk N/20 and at a rest site V at the mouth of an associated guide F/30.

In similar manner, the illustrative embodiment mode of FIGS. 4 and 4*a* uses an actuation unit 10 having a handle 12, of which an end face of the neck 14 comprising a square hole 15 may be noted underneath a flange (or an axial screw 21). A disk 20 is rotatably connected through the annulus 21 with the handle neck 14, said disk being supported in a stop 18 and comprising at its periphery 22 four outwardly at least partly open circular grooves 25. Said grooves are used for interlocking, using balls 40 of which the diameter exceeds at least slightly that of the circular grooves 25; said balls moreover being interlockable by means of omitted loading springs guided in slightly oblique manner perpendicularly to the plane of the drawing into the positions shown in double dashes.

There are considerable differences between the illustrative embodiment modes of FIGS. 3 through 4a and the state of the art and they will be elucidated below in the light of the terminology used herein. In the state of the art, a disk 20 may be rotatably supported but axially fixed within a detent sub-assembly K comprising a detent ball 18 or the like guided radially relatively to the axis of rotation C, said disk being fitted at its circumference with equidistant notches L. In general the number of notches is a multiple of the number of detent elements which engage the disk circumference equally spaced apart. Accordingly, in the detent interlocking position, the detent elements R—which usually are present in pairs— each drop into their associated notches L, the result being a seeming equality of geometric overlap. To allow the (or each) detent element R to move freely radially, it is however inevitable that each guide F exhibit a play determined by manufacturing and operational conditions. As a consequence, and at the end of a handle 12, such a play manifests itself by the lever arm's much amplified assembly play in the form of an undesirably loose fit.

The invention, on the other hand, meets this difficulty by providing at least two pairs of detent interlocking positions, though not in geometrically congruent positions, but instead being offset (by their axes), as shown clearly in particular in FIG. 1 and FIG. 3a. In the process the two detent elements R, (or the balls) 40, in the interlocked position of the detent assembly, may be situated on an axis A which intersects the axis of rotation C, the recesses L constituted by the two notches 24 being excentrically offset from said axis A. Alternatively the gaps or recesses L may be distributed at different angles over the circumference, for instance at the ends of an upper "arc" of 182° and a "lower" arc of 178°. Accordingly the symmetry deviation of the present invention wholly eliminates the annoying play of the detent assembly of the state of the art and it does so regardless of manufacturing or assembly tolerances.

The detent assemblies of the invention also are applicable to rotationally asymmetrical designs. As regards a linear design, the two detent sub-assemblies may be a parallelipipedic detent element K and a recess plate N in the detent element K displaceable relative to said detent element. Two overlapping blind holes of equal diameters may be configured in the detent sub-assembly K (FIGS. 5 through 5c). One of said blind holes is a guide F/30 and receives a compression spring 36 directly applying a force B on a compression ball D. A ball R is guided in another blind hole situated in axially parallel manner and is loaded by said compressive ball D by a force V. The ball R is situated opposite the rim M of an elongated slot L or 38 which preferably shall be configured transversely to the displacement direction of the sub-assemblies K, N. When the plate N assumes the position shown in FIG. 5b, the ball R shall laterally engage in detenting manner the actuation point U of the wall T. FIG. 5c shows the released position at which the displaced disk N by its slot rim has raised the detent balls R and the compression ball D resting against the ball R at its action point V against the force B in a manner that the sub-assemblies K. N may slide past each other.

Those detent assembly designs offer the considerable advantage that even following wear at the edges/rims after prolonged use, the detent mechanism, being spring-loaded, shall appropriately adjust itself. Contrary to the typical case of the state of the art in which the detent ball rests against one side, in the case of the invention, even where only one ball is employed, said ball rests in stable equilibrium on the two rims of the elongated slot, the interlocking force so attained being able to suppress any shift between the sub-assemblies K and N provided the compressed spring 36 be appropriately selected.

The invention disclosed herein is not restricted to one of the above described embodiment modes, on the contrary it may be modified in many ways. Illustratively, the recesses L or 24/25/38 instead of being open holes also may be in the form of troughs, channels or the like, and/or other designs of the limits M may be employed, provided solely that the actual recess interlocking diameter be less than the actual interlocking diameter of the balls R or 40 and that the latter even in their lowermost positions shall be at least minimally spaced from a bottom in said recess. Furthermore one compression ball D may also load several detent balls R when said balls' guide ducts enclose the central guide F concentrically or symmetrically. Also the spring-loaded compression or detent balls may be arrayed in rows.

In summary, detent assemblies comprising mutually displaceable pairs of sub-assemblies, namely the sub-assembly pairs K/N, of which the individual parts comprise spatially directly adjoining surfaces G/H, where the projecting elements R cooperate in prestressed manner with notches L, according to the present invention comprise at least one prestressed detent ball R or the like which is situated within a detent sub-assembly K and which is kept, in particular trapped within a guide F in a manner that it shall project beyond an outside surface G of the detent sub-assembly and, while being obliquely loaded, shall partly enter a sub-assembly N of an associated notch L of an opposite outer surface H. The guide F the point-wise supported detent ball R is directed in a way that said ball R presses only point-wise against the notch edge M of the associated sub-assembly N.

As regards one preferred design/embodiment mode, an actuation means 10 for doors, windows and the like is fitted with a handle 12 which is supported in rotatable but axially fixed manner by means of a neck or extension 14 in or at a stop 18. A driver, for instance a square pin, driving a locking mechanism, may be inserted into an axial recess 15 of the handle extension 14. The stop 18 supports a disk irrotationally linked to the disk 20 which is fitted at or near its circumference 22 with recesses such as notches 24, 25. Guides 30 issue near the disk circumference and are diametrically opposite each other on both sides of the disk 20 preferably along their axis A and contain compression springs 36 and balls 40 loaded by said springs and guide said balls at an acute angle to the line of symmetry S of the notches 24/25. In their final position the guide-supported detent balls 40 rest point-wise against the detent recesses 24, 25 of the recess sub-assembly N, and as a result playless rotational reliability is attained.

All features and advantages explicit and implicit in and from the claims, the specification and the drawing, including all details, spatial configurations and procedural steps, are included per se and also in arbitrary combinations in the present invention.

LIST OF REFERENCE SYMBOLS

A axis
B loading/stressing force

C Axis of rotation
D compression body/ball
F guide
G outside surface (of K)
H outside surface (of N)
K detent sub-assembly
L recess/hole
M boundary/rim
N recess sub-assembly
P (lower) plate
R detent body/ball
S axis of symmetry
T (support) wall
U, V, W applied force vectors
10 actuation means
12 handle
14 handle extension/neck
15 square hole
16 housing
18 stop
19 sub-assembly
20 disk
21 flange/axial screw
22 circumference/periphery
24 notch(es)
25 round notch(es)
29 cam/tappet (boreholes)
30 guide/duct
32 notch bottom
34 notch flank(s)
36 (compression) spring
38 elongated slot
40 (detent) ball

The invention claimed is:

1. A detent assembly comprising:
a first sub-assembly and a second sub-assembly mutually displaceable sub-assemblies, at least one of the first and second sub-assemblies being rotationally displaceable with respect to the other sub-assembly,
each of the first and second sub-assemblies including an outer surface, the first and second sub-assemblies being arranged and configured such that the outer surfaces of the first and second sub-assemblies are adjacent one another;
the first sub-assembly defining at least one guide;
the second sub-assembly defining at least one disk recess in its outer surface, the recess being defined by boundaries;
at least one detent element located within the at least one guide said detent element being biased towards the outer surface of the second sub-assembly and tending to project at least partially out of the at least one guide when the disk recess is in communication with the at least one guide, thereby tending to retain the at least one recess in communication with the at least one guide, wherein the at least one guide is configured such that one side of the at least one detent element contacts a single portion of the at least one disk recess and the other side of the at least one detent element contacts a rest site defined by the at least one guide when the at least one guide is in communication with the at least one disk recess,
wherein, said detent assembly is configured to interface with an actuation mechanism for one of a door and a window;
wherein, the at least one detent element is a ball which is loaded in its guide by a compression spring and wherein when the detent element is in a detent interlocked configuration the at least one detent element is excentrically offset from the recess boundary;
wherein, the at least one disk recess defines an oblique rest edge which is configured obliquely away from a boundary of the at least one disk recess, said rest edge being a notch flank that supports the at least one detent element, the at least one detent element configured not to make contact with the boundary of said recess when said at least one detent element is configured in the detent interlocked configuration;
wherein, the second sub-assembly is configured to couple to a rotatable body and rotatable about an axis and wherein the second sub-assembly is fitted at or near its circumference with at least one disk recess comprising a rest rim, said disk recess being configured to receive the detent element retained in the associated first sub-assembly as the second sub-assembly is rotated about the axis by a handle coupled to the second sub-assembly, said detent element being urged by the spring towards the recess and being excentrically offset by the at least one guide in the first sub-assembly from the rest edge; and
wherein, the second sub-assembly configured as a disk comprise at least one pair of diametrically opposite disk recesses, inhibiting rotation of the second sub-assembly when the detent assembly is in the interlocked configuration.

2. The detent assembly as claimed in claim 1, wherein the at least one detent element comes to rest at an angle defined by the predetermined direction of the at least one guide proximate the associated recess.

3. The detent assembly as claimed in claim 1, wherein the at least one recess one of a notch, a circular hole and an elongated slot.

4. The detent assembly as claimed in claim 1, wherein a recess boundary defines a plane running perpendicularly to a line of symmetry of the recess.

5. The detent assembly as claimed in claim 4, wherein the at least one guide is oriented at a predetermined angle to the line of symmetry of the recess.

6. The detent assembly as claimed in claim 1, wherein said detent assembly comprises at least two pairs of mutually associated interlocking detents and two sub-assemblies, including at least two detent elements and at least two recesses.

7. The detent assembly as claimed in claim 1, wherein the recess comprises an axis of symmetry perpendicular or parallel to its boundary whereby the sub-assemblies can be interlocked in the axial or radial directions.

8. The detent assembly as claimed in claim 1, wherein the disk is retained in a stop and is irrotationally affixed to a handle neck or extension, and wherein the disk is configured to be interlocked in play-free manner by the detent elements supported in the guides.

9. The detent assembly as claimed in claim 8, wherein the stop defines a recess of a similar shape as said disk configured to receive said disk, the guide issuing into said recess.

10. The detent assembly as claimed in claim 8, wherein the extension of the handle is fitted at its end face with a blind hole receiving a matched drive pin configured to actuate a latching or locking mechanism.

11. A detent assembly comprising:
a first sub-assembly including an outer surface defining at least two guides;
the first sub-assembly including at least two detent elements, each of the detent elements including a revolving element and a spring;

the at least two guides being arranged and configured to accommodate each a revolving element and the spring;

a second sub-assembly including an outer surface;

the second sub-assembly defining at least two disk recesses, each of said disk recesses bounded by two notch flanks;

a handle coupled to the second sub-assembly and arranged and configured to selectively rotationally displace the second sub-assembly relative to the first sub-assembly, wherein the detent assembly is configured to interface with an actuation mechanism for one of a door and a window;

the outer surfaces of said first sub-assembly and said second sub-assembly being arranged and configured adjacent one another;

the at least one recess defining a first axis of symmetry;

the at least one guide defining a second axis of symmetry, the second axis being non-parallel with the first axis symmetry when the detent assembly is selectively configured in a detent interlocked configuration;

the at least one guide configured such that the spring biases the revolving element towards the second sub-assembly along the second axis, tending to urge the revolving element to contact one of the notch flanks at a point of application when the at least one recess is in communication with the at least one guide;

wherein the second sub-assembly defines a disk, which is supported in a stop, the disk defining at its circumference with the at least two recesses which are notches and which are configured in cross-wide manner opposite each other;

wherein the two guides are arranged mutually diametrically opposite to each other and being offset obliquely to the main dimension of the stop, the guides and the notches forming at least two pairs of detent interlocking positions wherein when the assembly is in the interlocked configuration as the second sub-assembly is rotated by the handle, the detent elements are situated on an axis which intersects the axis of rotation and the notches are excentrically offset from said axis.

12. The detent assembly of claim 11, wherein when the detent assembly is configured in a detent interlocked configuration, the revolving element contacts only one of the two notch flanks of the at least one recess, resulting in a play-free interlocking of the detent assembly.

13. The detent assembly of claim 11, wherein the revolving element is a ball.

14. The detent assembly of claim 11, wherein when the detent assembly is configured in the detent interlocked configuration, the revolving element is configured to contact the at least one guide at a rest site within the at least one guide.

15. The detent assembly of claim 11, wherein the recesses are distributed at different angles over the circumference of the disk.

\* \* \* \* \*